United States Patent [19]

Ohzeki et al.

[11] Patent Number: 5,004,941
[45] Date of Patent: Apr. 2, 1991

[54] STEPPER MOTOR WITH INPUT CONNECTOR ARRAY

[75] Inventors: Yoshiyuki Ohzeki; Kazuo Amikura, both of Tokyo, Japan

[73] Assignee: Copal Co., Ltd., Tokyo, Japan

[21] Appl. No.: 447,225

[22] Filed: Dec. 7, 1989

[30] Foreign Application Priority Data

Dec. 9, 1988 [JP] Japan ................ 63-160208[U]

[51] Int. Cl.$^5$ .................. H02K 1/18; H02K 19/02
[52] U.S. Cl. .................. 310/49 R; 310/208; 336/198
[58] Field of Search ............ 242/1.1 R, 222; 310/49 R, 208, 71; 336/198, 208; 439/38

[56] References Cited

U.S. PATENT DOCUMENTS

| 3,843,946 | 10/1974 | Anderson et al. | 336/198 |
| 4,825,112 | 4/1989 | Mineyama | 310/49 R |
| 4,841,190 | 6/1989 | Matsushita et al. | 310/49 R |
| 4,924,124 | 5/1990 | Kato | 310/49 R |
| 4,942,325 | 7/1990 | Fukaya | 310/49 R |

Primary Examiner—Steven L. Stephan
Assistant Examiner—D. L. Rebsch

[57] ABSTRACT

A stepper motor in which the end portions of each of a pair of conductors are connected to their corresponding terminal processing units arranged in one array in the circumferential direction outside of stator units. The terminal processing units are integral with bobbins on which the conductor is wound in the stepper motor.

6 Claims, 4 Drawing Sheets

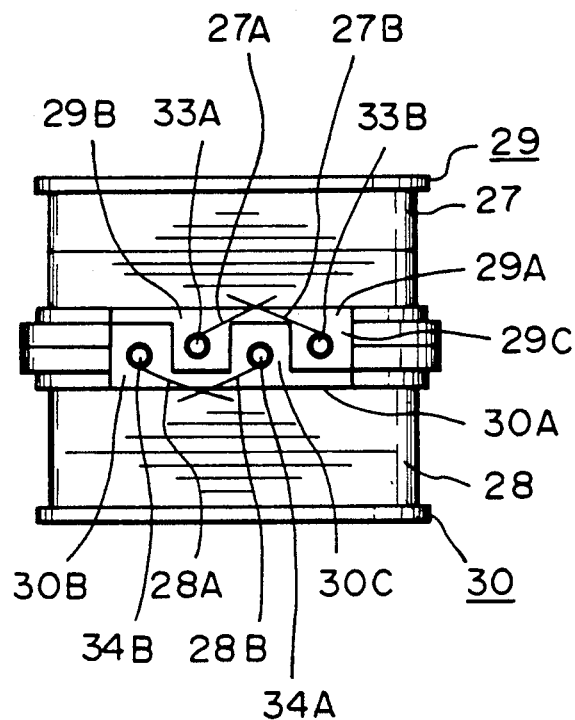
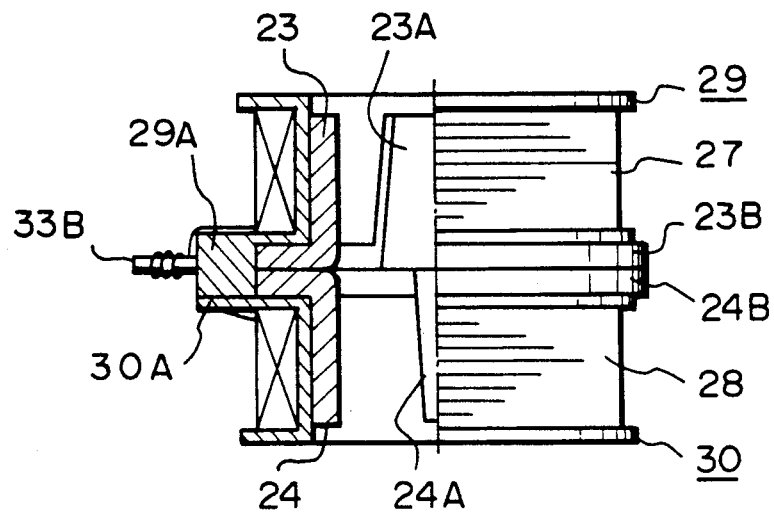

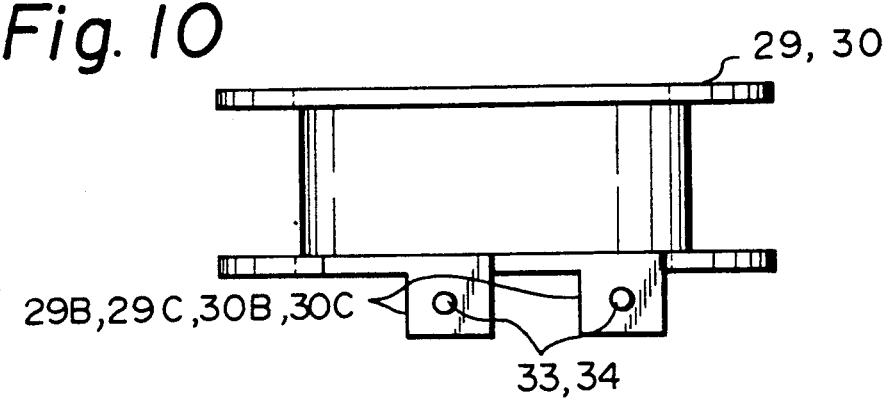
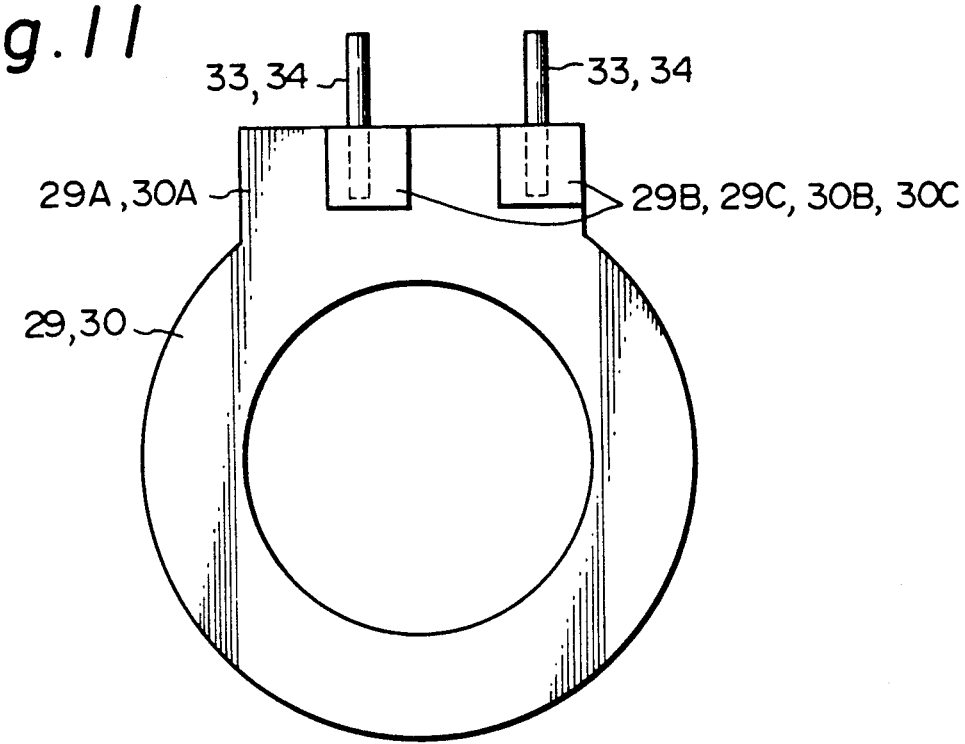
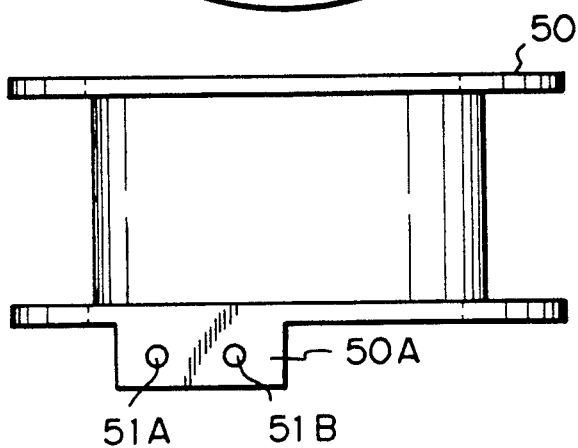

STEPPER MOTOR WITH INPUT CONNECTOR ARRAY

BACKGROUND OF THE INVENTION

1. Field of the Invention

The present invention relates to a so-called two phase stepper motor in which each pair of conductors which is wound around each of two bobbins in different phase is disposed outside of a rotating shaft so that by sequentially applying input pulses through each conductor, the motor rotates through a predetermined angle.

The stepper motors of the type described have suddenly become very important since the development and uses of ICs advanced widely so that processing of digital signals can be carried out in a simple and economical manner.

2. Description of the Prior Art

First referring to FIGS. 1, 2, 3 and 4 of the accompanying drawings, the conventional stepper motors of the type described above will be explained prior to the detailed description of the present invention for the sake of better understanding thereof.

A conventional stepper motor as shown in FIGS. 1 and 2, has a pair of stator units 2 and 3 which have different phases disposed in parallel in the vicinity of a rotating shaft 1 and bobbins 6 and 7 around which are wound conductors 4 and 5, housed in the stator units 2 and 3. A pair of terminal processing units in the form of a metal pin are extended from both ends of the bobbin 6 in the radial direction. In like manner, a pair of terminal processing units are extended radially from both ends of the bobbin 7. The end portions 4A and 4B; 5A and 5B of the conductors 4 and 5 are wound around the processing units 4A and 4B; 5A and 5B so that they are electrically interconnected. Furthermore, the bobbins 6 and 7 are so housed within the stator units 2 and 3 that the terminal processing units 8A and 8B; 9A and 9B are in opposing relationship with each other. The terminal processing units 8A and 8B; 9A and 9B are extended outwardly through an opening 10 defined at the adjacent portions of the stator units 2 and 3. It follows therefore that the terminal processing units 8A and 8B; 9A and 9B are arranged in two rows in the axial direction.

Next referring to FIGS. 3 and 4, a second conventional stepper motor will be described. Like the first conventional stepper motor of the type described above with reference to FIGS. 1 and 2, the bobbins 6 and 7 are so disposed that the processing terminal units 8A and 8B; 9A and 9B extended from the bobbins 6 and 7 are arranged at one end portion of the rotating shaft 1 in the axial direction thereof. Therefore the terminal processing units 8A and 8B; 9A and 9B are arrayed in two rows and spaced apart from each other by a suitable direction in the axial direction. The bobbins 6 and 7 are housed within a stator unit 12 and the terminal processing units 8A and 8B; 9A and 9B are extended outwardly through an opening 13 defined in the stator unit 12. The remaining component parts are arranged in a manner substantially to that of the first conventional stepper motor described above with reference to FIGS. 1 and 2.

However, since in the first and second conventional stepper motors of the types described above, the terminal processing units 8A and 8B; 9A and 9B are arrayed in two rows in the axial direction, the portions of the stator units 2, 3 and 12 through which are extended the terminal processing units 8A and 8B; 9A and 9B outwardly must be defined widely through the outer walls of the stator units 2, 3 and 12. Especially in case of the small-sized stepper motors, it becomes difficult to secure a wide portion through which the terminal processing units 8A and 8B; 9A and 9B are extended outwardly.

SUMMARY OF THE PRESENT INVENTION

In view of the above, the primary object of the present invention is to provide a stepper motor which can substantially solve the problems encountered in the conventional stepper motors as described above, can decrease the space at which the terminal processing units of the conductors to a minimum and can permit the outward extension of the terminal processing units in a simple manner especially in the case of a small-sized stepper motor.

To the above and other ends, in the stepper motor of the type in which conductors wound around bobbins are housed within a pair of stator units disposed around a rotating shaft in the axial direction thereof; and the end portions of a pair of the conductors are connected to terminal processing units disposed outside of the stator units, the present invention is characterized in that said terminal processing units are arranged in one array in the circumferential direction.

According to the above-mentioned construction, both of the ends of the conductor disposed in each of a pair of stator units are electrically connected and the total of two pairs of terminal units are arranged in one array in the circumferential direction of a rotating shaft so that the space of a plurality of terminal processing units extended through the stationary wall can be considerably decreased as compared with the above-mentioned first and second stepper motors. Especially in the case of a small-sized stepper motor, the terminal processing units can be arranged in a simple manner around the outer peripheral surface of the stator unit.

BRIEF DESCRIPTION OF THE ACCOMPANYING DRAWINGS

FIGS. 8 and 9 are a front view and a side view partly in section of the stepper motor in which a bobbin is mounted on a first yoke;

FIGS. 10 and 11 are a front view and a side view of a bobbin; and

FIG. 12 is a front view illustrating a bobbin of a second preferred embodiment of the present invention.

DETAILED DESCRIPTION OF THE PREFERRED EMBODIMENTS

First Embodiment, FIGS. 5-11

Figure 1:
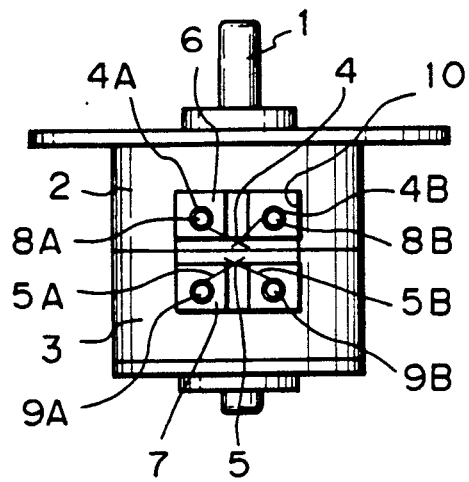
FIGS. 1 and 2 are a front view and a side view of a first conventional stepper motor.
Figure 2:
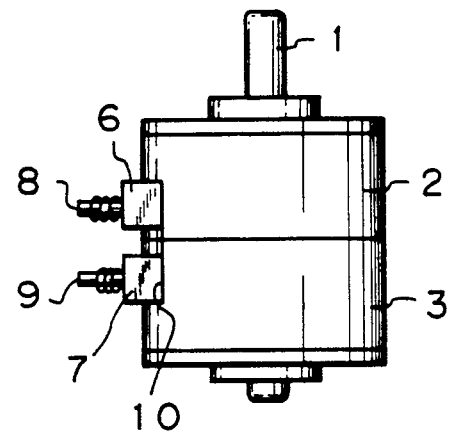
Figure 3:
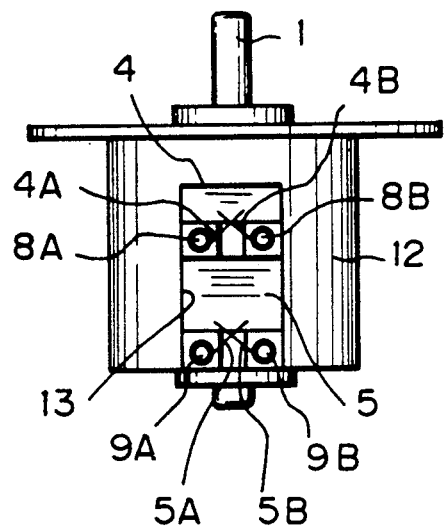
FIGS. 3 and 4 are a front view and a side view of a second conventional stepper motor.
Figure 4:
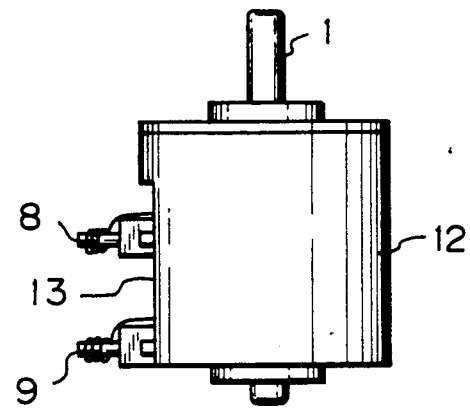

Referring now to FIGS. 5-11, a first preferred embodiment of a stepper motor in accordance with the present invention will be described. First a pair of stator units 21 and 22 are constructed by assembling first yokes 23 and 24 and second yokes 25 and 26. The first yokes 23 and 24 comprise ring-plate-shaped end plates 23B and 24B which define an end plate on the side of the contact between the stator units 21 and 22; and a plurality of magnetic pole pieces 23A and 24A extended in the axial direction and spaced apart from each other by a suitable distance and constructed as a whole in the form of a cylinder. The first yokes 23 and 24 are connected to each other by the end plates 23B and 24B (See FIG. 9).

The second yokes 25 and 26 define end walls in opposing relationship with outer peripheral walls 25A and 26A which in turn define the outer peripheral walls of the stator units 21 and 22 and with the end plates 23B and 24B of the stator units 21 and 22. The ends of the outer peripheral plates 25A and 26A which are spaced apart from each other by a suitable distance have the ring-plate-shaped end plates 25B and 26B extended in the inner peripheral direction and a plurality of magnetic pole pieces 25C and 26C extended substantially in the form of a cylinder as a whole from the inner peripheral edges of the end plates 25B and 26B and spaced apart from each other by a suitable distance within the inner peripheral sides of the outer peripheral plates 25A and 26A. The second yokes 25 and 26 are assembled with the first yokes 23 and 24 in such a way that magnetic pole pieces 25C and 26C are loosely fitted between the magnetic pole pieces 23A and 24A of the first yokes 23 and 24. Thus the second yokes 25 and 26 and the first yokes 23 and 24 are assembled to define a pair of stator units 21 and 22.

Within the hollow portions 21A and 22A of the stator units 21 and 22, reel shaped bobbins 29 and 30, around which are wound conductors 27 and 28, are fitted over the magnetic pole pieces 23A, 24A, 25C and 26C. In this case, prior to the assembling of second yokes 25 and 26 with the first yokes 23 and 24, the bobbins 29 and 30 are fitted within the hollow portions 21A and 22A.

As best shown in FIGS. 10 and 11, the bobbins 29 and 30 have the same shape. A stand portion 29A (30A) is radially outwardly extended from a predetermined peripheral edge portion of the bobbin 29 (30). Block-shaped projections 29B and 29C (30B and 30C) are extended in the axial direction of the rotating shaft 1 from the stand portion 29A (30A) and are spaced apart from each other by suitable distance in the direction of tangent lines to the bobbin 29 (30). The space is so determined that the projections 29B and 29C are snugly fitted.

Pin-shaped metal terminal processing units 33A, 33B, 34A and 34B are extended substantially radially outwardly from the projections 29B, 29C, 30B and 30C. As best shown in FIG. 8 the end portions 27A, 27B, 28A and 28B of the conductors 27 and 28 are wound around the terminal processing units 33A, 33B, 34A and 34B so as to establish an electrical connection.

The projections 29B, 29C, 30B and 30C of the bobbins 29 and 30 are engaged with the magnetic pole pieces 23A and 24A in such a way that the projections 29B, 29C, 30B and 30C are alternately engaged with the spaces and arranged so as to form one row. The projections 29B, 29C, 30B and 30C arranged in one array are extended outwardly through an opening 37 defined by the output portions 35 and 36 at the opposing ends of the outer peripheral plates 25A and 26A of the stator units 21 and 22. Therefore, the array of the terminal processing units 33A, 33B, 34A and 34B around which are alternately connected to the conductor 27 or 28 in different phase are extended outwardly through the opening 37.

Supporting plates 38 and 39 are securely joined by welding or the like to the end plates 25B and 26B of the stator units 21 and 22 and joint holes 40 and 41 are opened at the centers of the supporting plates 38 and 39. Bearings 42 and 43 are securely fitted into the mounting holes 40 and 41 and a rotating shaft 44 is rotatably supported by the bearings 42 and 43 and is extended through the inner peripheral walls of the first yokes 23 and 24. A rotor 45 made of a magnetic material is securely attached to the rotating shaft 44 between the first yokes 23 and 24 and the rotating shaft 44.

Next the mode of operation of the first embodiment with the above-described construction will be described.

Electric current is made to flow sequentially through the conductors 27 and 28 through the terminal processing units 33A, 33B, 34A and 34B. Since the conductors 27 and 28 are wound around the bobbins 29 and 30, the rotator 45 is intermittently rotated through a predetermined angle so that the rotating shaft 45 is also intermittently rotated through a predetermined angle.

According to the first embodiment, the terminal processing units 33A, 33B, 34A and 34B to which are connected the end portions of the conductors 27 and 38 are concentrated at the space defined by the opposing end portions of the stator units 21 and 22 and are arranged in one array in the circumferential direction. As a result, the dead space defined by the bobbins 29 and 30 can be decreased and the space required for forming the terminal processing units 33A, 33B, 34A and 34B can be also reduced. Especially in the case of a small-sized stepper motor, the terminal processing units 33A, 33B, 34A and 34B can be formed in a simple manner. Furthermore in the first embodiment, the conductors 27 and 28 are alternately connected to the terminal processing units 33A, 33B, 34A and 34B in one array so that the distances between the terminal processing units 33A, 33B, 34A and 34B extended from the bobbins 29 and 30 can be increased. As a result, it becomes easy to wind the end portions of the conductors 27 and 28 around the terminal processing units 33A, 33B, 34A and 34B by the automatic wire winders so that the fabrication cost can be decreased.

Second Embodiment, FIG. 12

FIG. 12 is a side view of a bobbin used in a second embodiment of the present invention. In the second embodiment, the projections 29B, 29C, 30B and 30C of the above-mentioned bobbins 29 and 20 are made a projection 50A formed integrally with one side of the stand units 29A and 30A. The projection 50A has terminal processing units 51A and 52A which are substantially similar in shape to those shown in FIGS. 10 and 11.

Figure 5:
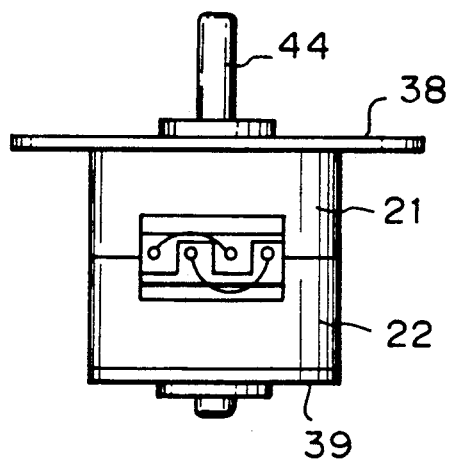
FIGS. 5 and 6 are a front view and a side view of a first embodiment of a stepper motor in accordance with the present invention.
Figure 6:
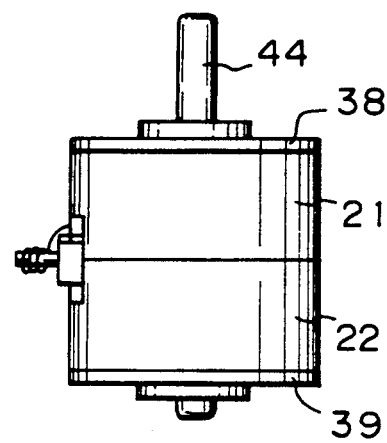
Figure 7:
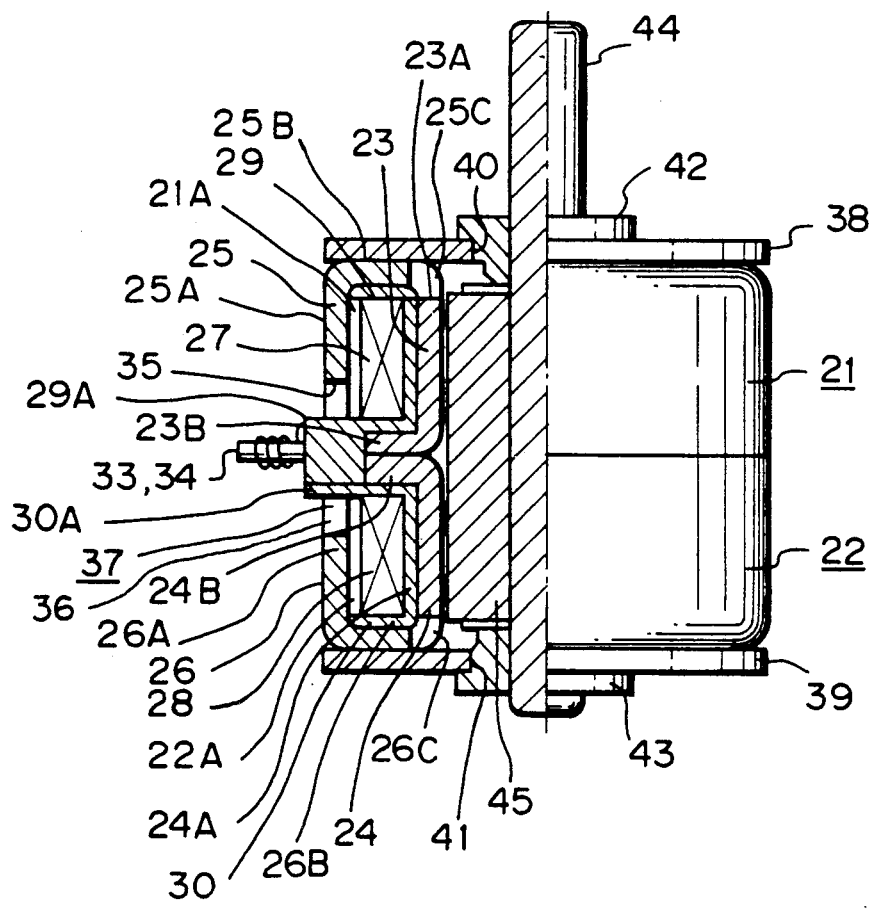
FIG. 7 is a side view illustrating the right portion in section thereof.

In the case of the stepper motor using such bobbins 50, like the stepper motor shown in FIG. 5, the terminal processing units 51A, 51B, 51A, 51B are arranged in one array in the circumferential direction at the joint between the stator units 21 and 22. However, unlike FIG. 5, both the end portions of the same conductor 27 or 28 are connected to the adjacent terminal processing units 51A, 51B, 51A, 51B. In the case of the stepper motor using such bobbins 50, the dead space between the bobbins 29 and 30 can be decreased and the space in which terminal processing units 51A, 51B, 51A and 51B are formed can be reduced. Especially, in the case of a small-sized stepper motor, the terminal processing units 51A, 51B, 51A and 51B can be formed in a simple manner.

It is to be understood that the present invention is not limited to the embodiments described above and that various modifications can be effected without leaving the true spirit of the present invention.

What is claimed is:

1. A stepper motor comprising:
   a. a rotor made of magnetic material;
   b. a rotatable output shaft having said rotor mounted thereon;
   c. a pair of stator units, each comprising:
      i. a first yoke having an axially elongated cylindrical portion including circumferentially spaced, axially elongated magnetic pole pieces annularly positioned about said output shaft and a radially outwardly extending annular ring-shaped portion;
      ii. a second yoke including a generally cylindrical wall portion of greater diameter than said cylindrical portion of said first yoke defining a cylindrical exterior of said stator unit and a radially inwardly extending annular portion having magnetic pole pieces in spaced alternating arrangement with said magnetic pole pieces of said first yoke;
      iii. a bobbin retained between said cylindrical portion of said first yoke and said radial portion of said second yoke, said bobbin including:
         (1) a generally cylindrical axially elongated core;
         (2) a pair of planar radially extending annular flanges on respective axial ends of said core;
            (a) an outwardly facing surface of said flange which is farther from said remaining stator unit of said pair being in facing complemental contact with said radially extending portion of said second yoke;
            (b) a radially outwardly facing edge of said flange which is farther from said remaining stator unit of said pair being in facing complemental contact with said cylindrical wall portion of said second yoke;
            (c) an inner annular surface of said cylindrical core being in facing complemental contact with said cylindrical portion of said first yoke;
            (d) said flange which is closer to said remaining stator unit of said pair
               (i) facingly contacting said radially outwardly extending annular ring-shaped portion of said first yoke;
               (ii) having a plurality of solid rectangular lugs formed integrally therewith, said lugs extending radially outwardly from said flange and extending axially from an axially outwardly facing surface of said flange axially away from said flange;
         (3) sinous electrically conductive material annularly wound about said bobbin core;
   d. said stator units adjoiningly connecting by
      i. respective axially facing surfaces of said annular ring-shaped portions of said first yokes facingly contacting one another;
      ii. respective exterior cylindrical surfaces of said cylindrical wall portions of said second yokes contacting one with another to define a generally closed cylindrical exterior of said stepper motor;
   e. said rectangular lugs of said respective bobbins of said respective stator units protruding through a common rectangular opening in said generally closed cylindrical exterior of said stepper motor;
   f. said lugs of said respective bobbins being in interleaved facing complemental contact along lug planar surfaces perpendicular to the output shaft;
   g. axially extending angularly outwardly facing surfaces of end ones of said interleaved lugs facingly contacting axially extending surfaces of said rectangular opening;
   h. respective annular ring-shaped portions of said first yokes of said respective stator units abuttingly contacting substantially the entirety of radially inwardly facing surfaces of all of said interleaved lugs;
   i. means for electrically connecting said sinous annularly disposed electrically conductive material with an external source of electrical power, one such connecting means extending radially outwardly from each radially outwardly facing surface of one of said lugs;
   j. said sinous electrically conductive material annularly would about said bobbin core connected to connecting means extending from said lug which are integral with said respective bobbins independently of connection of said stator units.

2. The stepper motor in claim 1 wherein said stator units are fixed between plates.

3. The stepper motor in claim 2 wherein said plates contain bearing assemblies for said rotatable shaft.

4. A stepper motor comprising:
   a. a rotor made of magnetic material;
   b. a rotatable output shaft having said rotor mounted thereon;
   c. a pair of stator units, each comprising:
      i. a first yoke having an axially elongated cylindrical portion including circumferentially spaced, axially elongated magnetic pole pieces annularly positioned about said output shaft and a radially outwardly extending annular ring-shaped portion;
      ii. a second yoke including a generally cylindrical wall portion of greater diameter than said cylindrical portion of said first yoke defining a cylindrical exterior of said stator unit and a radially inwardly extending annular portion having magnetic pole pieces in spaced alternating arrangement with said magnetic pole pieces of said first yoke;
      iii. a bobbin retained between said cylindrical portion of said first yoke and said radial portion of said second yoke, said bobbin including:
         (1) a generally cylindrical axially elongated core;
         (2) a pair of planar radially extending annular flanges on respective axial ends of said core;
            (a) an outwardly facing surface of said flange which is farther from said remaining stator unit of said pair being in facing complemental contact with said radially extending portion of said second yoke;
            (b) a radially outwardly facing edge of said flange which is farther from said remaining stator unit of said pair being in facing complemental contact with said cylindrical wall portion of said second yoke;
            (c) an inner annular surface of said cylindrical core being in facing complemental contact with said cylindrical portion of said first yoke;
            (d) said flange which is closer to said remaining stator unit of said pair
               (i) facingly contacting said radially outwardly extending annular ring-shaped portion of said first yoke;

(ii) having a solid rectangular lug formed integrally therewith, said lug extending radially outwardly from said flange and extending axially from an axially outwardly facing surface of said flange axially away from said flange;

(3) conductor placed about said bobbin core;

d. said stator units adjoining by
   i. respective axially facing surfaces of said annular ring-shaped portions of said first yokes facingly contacting one another;
   ii. respective exterior cylindrical surfaces of said cylindrical wall portions of said second yokes contacting one with another to define a generally closed cylindrical exterior of said stepper motor;

e. said rectangular lugs of said respective bobbins of said respective stator units protruding through a common rectangular opening in said generally closed cylindrical exterior of said stepper motor;

f. said lugs of said respective bobbins being in facing complemental contact along lug planar surfaces perpendicular to the output shaft;

g. axially extending angularly outwardly facing end surfaces of said lugs facingly contacting axially extending surfaces of said rectangular opening;

h. respective annular ring-shaped portions of said first yokes of said respective stator units abuttingly contacting substantially the entirety of radially inwardly facing surfaces of said lugs;

i. means for electrically connecting said annularly disposed sinous electrically conductive material with an external source of electrical power, extending radially outwardly from a radially outwardly facing surface of one of said lugs;

j. said sinous electrically conductive material annularly would about said bobbin core connected to connecting means extending from said lug which are integral with said respective bobbins independently of connection of said stator units.

5. The stepper motor in claim 4 wherein said stator units are fixed between plates.

6. The stepper motor in claim 5 wherein said plates contain bearing assemblies to support said rotatable shaft.

* * * * *